US008660197B2

(12) United States Patent
Lindgren et al.

(10) Patent No.: US 8,660,197 B2
(45) Date of Patent: Feb. 25, 2014

(54) METHOD OF AND EQUIPMENT FOR COMPENSATING CARRIER FREQUENCY OFFSET IN AN ORTHOGONAL FREQUENCY DIVISION MULTIPLEXING WIRELESS RADIO TRANSMISSION SYSTEM

(75) Inventors: Ulf Lindgren, Vastra Frolunda (SE); Henrik Sahlin, Molnlycke (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/254,075

(22) PCT Filed: Mar. 6, 2009

(86) PCT No.: PCT/EP2009/001625
§ 371 (c)(1),
(2), (4) Date: Aug. 31, 2011

(87) PCT Pub. No.: WO2010/099808
PCT Pub. Date: Sep. 10, 2010

(65) Prior Publication Data
US 2012/0014467 A1    Jan. 19, 2012

(51) Int. Cl.
*H04K 1/10* (2006.01)
(52) U.S. Cl.
USPC .............................. 375/260; 375/259; 455/59
(58) Field of Classification Search
USPC .......................................................... 375/260
See application file for complete search history.

(56) References Cited

U.S. PATENT DOCUMENTS

| | | | |
|---|---|---|---|
| 6,839,388 B2* | 1/2005 | Vaidyanathan | 375/326 |
| 7,020,791 B1* | 3/2006 | Aweya et al. | 713/400 |
| 7,545,870 B1 | 6/2009 | Shirakata et al. | |
| 7,702,024 B2 | 4/2010 | Kim et al. | |
| 8,131,218 B2* | 3/2012 | Kleider et al. | 455/59 |

(Continued)

FOREIGN PATENT DOCUMENTS

| | | |
|---|---|---|
| CN | 1574816 A | 2/2005 |
| WO | 2004059936 A1 | 7/2004 |

OTHER PUBLICATIONS

Catt, Ritt, "Cell Search Procedure of EUTRA TDD System for the Initial Synchronization", 3GPP Draft; R1-060930, 3rd Generation Partnership Project (3GPP), Mobile Competence Centre, vol. RAN WG1, No. 20060321, Mar. 21, 2006, pp. 1-12, XP050101833.
Lim, Young Seok. et al., "An Efficient Carrier Frequency Offset Estimation Scheme for an OFDM System", Vehicular Technology Conference, vol. 5, Sep. 24, 2000-Sep. 28, 2000, pp. 2453-2457, XP01052221.
Kim, Jung-Jin, et al., "Frame Selection Algorithm with Adaptive FFT Input for OFDM Systems", Proceedings of IEEE International Conference on Communications, vol. 1, Apr. 28, 2002-May 2, 2002, pp. 187-191, XP010589483.
Office Action issued in corresponding Japanese application No. 2011-552324 on Apr. 16, 2013, with English Summary of Ground for Rejection, 4 pages.
Office Action issued in corresponding Chinese application No. 200980158024.7 on Jul. 18, 2013, English Translation only, 3 pages.

*Primary Examiner* — Chieh M Fan
*Assistant Examiner* — Santiago Garcia
(74) *Attorney, Agent, or Firm* — Rothwell, Figg, Ernst & Manbeck, P.C.

(57) ABSTRACT

For compensating carrier frequency generation in communication equipment for radio transmission in an Orthogonal Frequency Division Multiplex, OFDM, based wireless radio communication system, in which reference signals known communication equipment are transmitted in a regular time repetitive manner, carrier frequency generation is compensated (63) by a calculated carrier frequency offset estimate. The carrier frequency offset estimate in the communication equipment is calculated from coarse (61) and fine carrier frequency offset estimates (62). The coarse carrier frequency offset estimate (61) is calculated in the frequency domain from reference symbols of a reference signal received (60) at the communication equipment and the fine carrier frequency offset estimate (62) is calculated in the time domain from reference symbols of reference signals repetitively received (60) at said communication equipment. An algorithm and an estimator module (90) for calculating a coarse carrier frequency offset are provided.

12 Claims, 9 Drawing Sheets

(56) References Cited

U.S. PATENT DOCUMENTS

| | | | |
|---|---|---|---|
| 8,270,502 B2* | 9/2012 | Lai | 375/260 |
| 8,374,264 B2* | 2/2013 | Kobayashi et al. | 375/260 |
| 2003/0072256 A1* | 4/2003 | Kim | 370/208 |
| 2005/0025264 A1* | 2/2005 | Chen | 375/346 |
| 2006/0133526 A1* | 6/2006 | Zhang et al. | 375/260 |
| 2008/0002794 A1* | 1/2008 | Wallace et al. | 375/347 |
| 2008/0043882 A1* | 2/2008 | Zhang et al. | 375/316 |
| 2008/0095250 A1 | 4/2008 | Kim et al. | |
| 2009/0052561 A1* | 2/2009 | Baxley et al. | 375/260 |
| 2009/0163143 A1* | 6/2009 | De Rore | 455/63.1 |

* cited by examiner

METHOD OF AND EQUIPMENT FOR COMPENSATING CARRIER FREQUENCY OFFSET IN AN ORTHOGONAL FREQUENCY DIVISION MULTIPLEXING WIRELESS RADIO TRANSMISSION SYSTEM

CROSS-REFERENCE TO RELATED APPLICATION

This application is a 35 U.S.C. §371 National Phase Entry Application from International Application No. PCT/EP2009/001625, filed Mar. 6, 2009 and designating the United States, the disclosure of which is incorporated by reference herein in its entirety.

TECHNICAL FIELD

The present invention relates generally to wireless radio transmission and, more specifically, to radio transmission in an Orthogonal Frequency Division Multiplexing (OFDM) based cellular wireless radio transmission network, comprising equipment arranged for compensating a carrier frequency offset.

BACKGROUND

Orthogonal Frequency Division Multiplexing (OFDM) is a widely known modulation scheme in which a digital serial data bit stream is split into parallel data bit streams that each modulate a different carrier, known as subcarrier, of a group of orthogonal carriers. The subcarriers are spaced apart at precise frequencies which prevents a receiving demodulator from distortions by frequencies other than the subcarrier frequency to which the demodulator is allocated. The bit rate of each parallel data stream is a fraction of the bit rate of the serial data bit stream, dependent on the number of subcarriers. Each subcarrier is modulated by a conventional modulation scheme, such as Quadrature Amplitude Modulation (QAM) and Quadrature Phase Shift Keying (QPSK), providing so-called OFDM symbols at a low symbol rate, i.e. where the symbols are relatively long compared to the channel time characteristics. An OFDM symbol comprises a number of data bits dependent on the modulation scheme used. The modulated subcarriers are combined together using an Inverse Fast Fourier Transform (IFFT) to yield a time-domain waveform to be transmitted. The total bit rate of all the subcarriers is comparable to a conventional single-carrier high-rate modulation scheme in the same bandwidth.

Since the duration of each symbol is relatively long, it is feasible to insert a guard interval between the OFDM symbols, also referred to as Cyclic Prefix (CP), for eliminating inter-symbol interference. However, the increased symbol duration makes an OFDM system more sensitive to the time variations of mobile radio channels. In particular, the effect of Doppler spreading destroys the orthogonality of the subcarriers, causing Inter-Carrier Interference (ICI), i.e. cross-talk between the sub-carriers. OFDM requires also a very accurate frequency synchronization between a receiver and transmitter.

In an OFDM like system, e.g. Long Term Evolution (LTE) or Evolved Universal Terrestrial Radio Access (E-UTRA), which is currently under development with the $3^{rd}$ Generation Partnership Project (3GPP) and disclosed in Technical Specification 3GPP TS 36.211 (Release 8), downlink radio transmission from a Base Station (BS) to User Equipment (UE) or Mobile Station (MS) is based on OFDM. The symbol information is related to the frequency bins (sub-carriers) of a Fast Fourier Transform (FFT). In the event that the carrier frequency at a BS and UE differs, a so-called frequency offset error occurs. In principle, the error is manifested as a shift of the subcarriers. The consequence is leakage, where spectral content from a user is spread to all users. To overcome this a user must be compensated for the frequency offset. In order to carry out the compensation the frequency error must be known. To his end a frequency estimator is used. The uplink, i.e. radio transmission from the MS to the UE, is based on SC-FDMA (Single Carrier-Frequency Division Multiplexing), which can be seen as a pre-coded version of OFDM.

A common method to estimate frequency offset is to use known signals, i.e. reference or pilot signals. These reference signals are transmitted regularly which means that the same signal will occur at over and over again. Exploiting a received reference signal provides an estimate of the frequency error. Several algorithms for frequency estimation are known in practice.

By way of example, in LTE a large number of narrow subcarriers is used for multi-carrier transmission. The basic LTE downlink resource is a time-frequency grid comprised of OFDM symbols, also called resource elements. In the frequency domain a resource element has a frequency bin of 15 kHz, which is the frequency spacing, $\Delta f$, between adjacent subcarriers. In the time domain the duration of an OFDM symbol or resource element is $(1/\Delta f)+CP$. The resource elements are grouped into resource blocks. A resource block has a total size of 180 kHz in the frequency domain, i.e. twelve resource elements, and 0.5 ms in the time domain, i.e. seven resource elements, called a time slot.

Resource blocks are transmitted in a so-called Transmission Time Interval (TTI) consisting of two time slots. Each user is allocated a number of resource blocks in the time-frequency grid. Which resource blocks and how many a user gets at a given point in time depends on advanced scheduling mechanisms, defined to enable optimal performance for different services in different radio environments.

In LTE uplink, per TTI two reference signals in the time domain are transmitted. This means that the distance between two similar reference signals or pilots is 0.5 ms. This fact limits the usable range for estimating frequency errors to the interval ±1000 Hz. In principle the range follows from the sampling theorem which states that the sampling frequency must be at least twice the highest frequency of the sampled signal. The time separation between two pilot signals is 0.5 ms which correspond to a sampling frequency of 2000 Hz. Evidently, it is possible to, unambiguously, resolve frequencies up to 1000 Hz.

According to the 3GPP standard, 3rd Generation Partnership Project, Technical Specification Group Radio Access Network; 25.913 v7.0.0 edition, 2005.a user should be able to travel at a speed of 350 km/h and the BS should be accurate to ±0.1 part per million (ppm) of the RF carrier frequency. This implies that if the RF carrier frequency is 2.5 GHz and including additional clock errors of 200 Hz, the frequency offset estimation must be able to resolve frequencies in a range up to ±1800 Hz. Hence, a frequency estimator using the information in two consecutive repetitive received reference signals in the time domain cannot meet the desired range.

In the frequency domain in LTE, using the reference symbols of a single reference signal for frequency error estimation, the usable range is limited to the interval ±15 kHz, i.e.

the frequency spacing Δf between reference symbols of adjacent subcarriers onto which the reference signal is modulated. This range is too coarse for meeting the desired range.

SUMMARY

An object is to provide an improved method of compensating carrier frequency generation in communication equipment for radio transmission in an OFDM based wireless radio communication system.

Another object is to provide communication equipment for radio transmission in an OFDM based wireless radio communication system applying the improved method of compensating carrier frequency generation.

In the present description and the claims, the expression OFDM based is to be construed to comprise all present and future types of Orthogonal Frequency Division Multiplexing (OFDM) independent of the number of transmit carriers, such as SC-FDMA (Single Carrier-Frequency Division Multiplexing) or single OFDM, and Orthogonal Frequency Division Multiple Access (OFDMA), for example, as well as wireless radio transmission systems such as Single-Input Single-Output (SISO) systems, wherein a mobile device communicates with wireless access equipment over a single transmission channel, and Multiple-Input Multiple-Output (MIMO) systems wherein a mobile device communicates with wireless access equipment over multiple transmission channels.

In a first aspect, there is provided a method of compensating carrier frequency generation in communication equipment for radio transmission in an OFDM based wireless radio communication system in which reference signals known to the communication equipment are transmitted in a regular time repetitive manner, wherein a carrier frequency offset estimate is calculated from reference signals received at the communication equipment, and wherein the carrier frequency generation is compensated by the calculated carrier frequency offset estimate. The method comprises the steps of:
- calculating a coarse carrier frequency offset estimate from reference symbols of a reference signal received at the communication equipment,
- calculating a fine carrier frequency offset estimate from reference symbols of reference signals repetitively received at the communication equipment, and
- compensating the carrier frequency generation in the communication equipment by the calculated coarse and fine carrier frequency offset estimates.

The method is based on the insight that by a joint use of a coarse carrier frequency offset estimate calculated from information of a particular reference signal in the frequency domain and a fine carrier frequency offset estimate calculated from repetitively receiving a same reference signal, i.e. from information in the time domain, the variance of the joint carrier frequency offset estimate is lowered. Accordingly, with the invention, a reliable carrier frequency offset estimate can be generated over a wider frequency interval without having to increase the repetition rate of a reference signal in the time domain, which would unduly reduce scarce transmission capacity of the OFDM radio communication system.

In LTE, for example, with the invention, at least an accurate joint carrier frequency offset estimate in the interval [−2000, 2000] Hz can be provided, which is sufficient to cover the desired frequency range of [−1800, 1800] for LTE, as outlined above.

In this description, when using the term coarse carrier frequency estimate this is meant to refer to the calculation of a carrier frequency offset estimate from information of a particular reference signal in the frequency domain. The term fine carrier frequency offset estimate refers herein to a carrier frequency offset estimate calculated from repetitively receiving a same reference signal in the time domain.

In a particular example of the method, the fine carrier frequency offset estimate is calculated from reference symbols repetitively received at the communication equipment after the carrier frequency generation in the communication equipment is compensated by the calculated coarse carrier frequency offset estimate. The coarse frequency offset estimate is used as a first compensation of the frequency carrier generation such that the remaining frequency offset advantageously falls in a lower range, which can be met by the fine carrier frequency offset estimate.

For LTE, with the above first compensation step, the remaining frequency offset error falls within the range of ±1000 Hz that can be compensated for by the use of repetitively received reference signals spaced at 0.5 ms.

To even further reduce the variance of the frequency offset error compensation, in another example, at least one of the calculated coarse and fine frequency offset estimates is smoothed, wherein the carrier frequency generation in the communication equipment is compensated by the at least one smoothened carrier frequency offset estimate. Preferably, the coarse frequency offset error is smoothed. However, the fine carrier frequency offset may be smoothed too.

In an example, smoothing comprises integration of a calculated carrier frequency offset estimate over a time period, which time period is set differently for each of the calculated coarse and fine carrier frequency offset estimates.

In another example, the step of smoothing comprises calculation of a time running average of a calculated carrier frequency offset estimate.

In practice several methods for calculating the coarse carrier frequency offset are know and may be used.

In "A technique for orthogonal frequency division multiplexing frequency offset correction", by P. H. Moose, *IEEE Transactions on Communications*, vol. 42, no. 10, October 1994, pages 2908-2914, a method is disclosed wherein the received carrier frequency signal is subjected to an FFT computation. From this FFT a term can be extracted affected by channel and carrier frequency offset. Assuming that a repeated reference signals is affected by the channel in the same manner, an estimate of the carrier frequency offset can be recovered.

A method known as the L-extension algorithm is described in "Residual carrier frequency offset tracking for ofdm-based systems", by C. Li, P. Chen and T. Lin, in *The 2004 IEEE Asia-Pacific Conference on Circuits and Systems*, December 2004, pages 989-992. This method is based on the above-mentioned method by Moose, however using FFT terms spaced at a distance L.

Another carrier frequency offset estimate method described by C. Li, P. Chen and T. Lin in The 2004 *IEEE Asia-Pacific Conference on Circuits and Systems*, December 2004, pages 989-992, is called the D-symbol method. This constitutes a minor modification of the L-extension method, by averaging the calculated carrier frequency offset over L-D estimates.

A method known as the symbol by symbol method is described in "Ofdm frequency offset estimation based on blue principle", by H. Minn, P. Tasarak and V. K. Bhargava, in *Proceedings of the Fall Vehicular Technology Conference*, vol. 2, IEEE, September 2002, pages 1230-1234. In this method a correlation of the received reference signals is estimated. The correlation is used to define intermediate parameters and these parameters are weighted to an estimate of the carrier offset frequency.

In addition to the methods for calculating a coarse carrier frequency offset estimate disclosed above, A. Ren, Q. Yin and Y. Meng in "Carrier frequency offset estimation for OFDM systems", *IEEE International Symposium on Circuits and Systems*, vol. 4, IEEE, 2005, pages 3019-22, describe a method exploiting second order statistics. A matrix of reference signal observations is formed. Two sub matrices are used to compute an auto correlation and a cross correlation. These matrices are in a series of manipulations used to compute a Direction Of Arrival (DOA) matrix which relates to a matrix for which the sum of the eigenvalues is proportional to the frequency error.

In a further aspect, a method of calculating a coarse frequency offset estimate is provided, including the steps of:
exploiting a reference signal received at the communication equipment in a sequence of reference symbols, each reference symbol modulated on a different subcarrier,
performing a time discrete frequency domain transformation of each reference symbol of the sequence of reference symbols with respect to the subcarriers,
normalising the time discrete frequency domain transformation of each reference symbol with respect to a time discrete frequency domain representation of a corresponding reference symbol of the reference signal known to the receiver equipment, providing a sequence of normalized time discrete frequency domain transformed reference symbols,
partitioning the sequence of normalized time discrete frequency domain transformed reference symbols in at least a first and a second set of consecutive normalized time discrete frequency domain transformed reference symbols,
multiplying each normalized time discrete frequency domain transformed reference symbol of a first set by a correspondingly located conjugate normalized time discrete frequency domain transformed reference symbol of a second set,
computing of each the multiplication its argument, and
averaging the computed arguments to provide the coarse frequency offset estimate.

It can be shown that the normalized time discrete frequency domain transformed reference symbols, which are modulated on a subcarrier, become linear in frequency but non-linear in frequency error. The multiplication of each subcarrier by a conjugated subcarrier a number of positions ahead, provides an exponential function of which the argument is linear with respect to the carrier frequency offset error. From this argument the carrier frequency offset error is computed and the coarse carrier frequency offset estimate is calculated from averaging the computed arguments. The variance of this carrier frequency offset estimate is reduced compared to the prior art methods, because a plurality of the subcarriers of the reference signal in the first and second set are used.

In order to reduce the variance even more, in a further example the multiplication and computation is repeated for all sets of normalized time discrete frequency domain transformed reference symbols.

In practice, accurate results for use in LTE, for example, can be achieved if the sequence of normalized time discrete frequency domain transformed reference symbols is partitioned in two sets.

The actual carrier frequency compensation, in another example, is performed in the frequency domain by computing a compensated carrier frequency grid from a sampled representation of a carrier frequency grid received at the communication equipment, shifted by the calculated coarse and fine carrier frequency offset estimates. Basically, one can use the sampling theorem and more precise the reconstruction formula. This formula states that any point on a band limited signal can be computed given a sampled representation of the signal in question. That is, the sampled signal is used and points between are interpolated using the impulse response of an ideal low-pass filter. The interpolation is equivalent to a filtering operation.

The method and examples above can be used in communication equipment such as radio access equipment and user equipment arranged for operation in a Long Term Evolution (LTE) cellular wireless radio transmission system.

In a second aspect communication equipment is provided, comprising a receiver device for receiving radio transmission in an Orthogonal Frequency Division Multiplex, OFDM, based wireless radio communication system, a carrier frequency generation device operatively connected to the receiver device and an estimator device operatively connected to the receiver device and the carrier frequency generation device. The estimator device is arranged for providing carrier frequency offset estimates from reference signals received by the receiver device for compensating carrier frequency generation by the carrier frequency generation device, by calculating a coarse carrier frequency offset estimate from a reference symbols of a reference signal received by the receiver device and by calculating a fine carrier frequency offset estimate from reference symbols of reference signals repetitively received by the receiver device. The carrier frequency generation by the carrier frequency generation device is compensated by the calculated coarse and fine carrier frequency offset estimates.

In a further example, the estimator device is advantageously arranged for calculating the fine carrier frequency offset estimate from reference symbols repetitively received at the communication device after the carrier frequency generation by the carrier frequency generation device is compensated by the calculated coarse carrier frequency offset estimate.

In another example the estimator device is arranged for smoothing at least one of the calculated coarse and fine carrier frequency offset estimate, and wherein the carrier frequency generation by the carrier frequency generation device is compensated by the at least one smoothened carrier frequency offset estimate.

The communication equipment, that is the receiver device, the carrier frequency generation device and the estimator device are, in a further example, arranged for operation in a Long Term Evolution (LTE) cellular wireless radio transmission system.

In a third aspect an estimator module is provided, for calculating a carrier frequency offset estimate from a reference signal transmitted in accordance with an Orthogonal Frequency Division Multiplex, OFDM, based wireless radio transmission scheme. The estimator module comprising:
an exploiting module, arranged for exploiting a reference signal in a sequence of reference symbols, each reference symbol being modulated on a different subcarrier,
a Fourier transform module, arranged for performing a time discrete frequency domain transformation of each reference symbol of the sequence of reference symbols,
a normalizing module, arranged for normalizing the time discrete frequency domain transformation of each reference symbol with respect to a time discrete frequency domain representation of a corresponding reference symbol of the reference signal known to the receiver equipment, providing a sequence of normalized time discrete frequency domain transformed reference symbols, a partitioning module, arranged for partitioning the sequence of normalized time discrete frequency domain transformed reference symbols in at least a first and a second set of consecutive normalized time discrete frequency domain transformed reference symbols, a multiplication module, arranged for multiplying each normalized time discrete frequency domain transformed reference symbol of a first set by a correspondingly located conjugate normalized time discrete frequency domain transformed reference symbol of a second set, a calculating module, arranged for calculating of each the multiplication its argument, and an averaging module, arranged for averaging the computed arguments to provide the frequency offset estimate.

In addition to the above-mentioned modules, the estimator module may comprise a further module or modules arranged for calculating carrier frequency offset estimates from repetitively received reference signals.

Those skilled in the art will appreciate that, in the present description and claims, terms like "equipment", "module", "device", "apparatus", "system" and the like may refer to a computer or processor related entity, either hardware, firmware, software or any combination thereof, which may be integrated into a single component or separate components provided with suitable interfaces for data exchange.

Various aspects of the invention will now be illustrated in more detail with reference to the following description and accompanying drawings of an LTE OFDM based wireless cellular radio transmission scheme. The examples of the invention disclosed are indicative for implementing the invention and are not intended nor to be construed as limiting the invention, the scope of which is defined by the appending claims.

DETAILED DESCRIPTION

In the following description, structures and devices which may be regarded known to the skilled person are shown in a general block diagram form, to facilitate the understanding of the invention. In the drawings and figures, like reference numerals refer to like or equivalent functions and structures.

Figure 1:
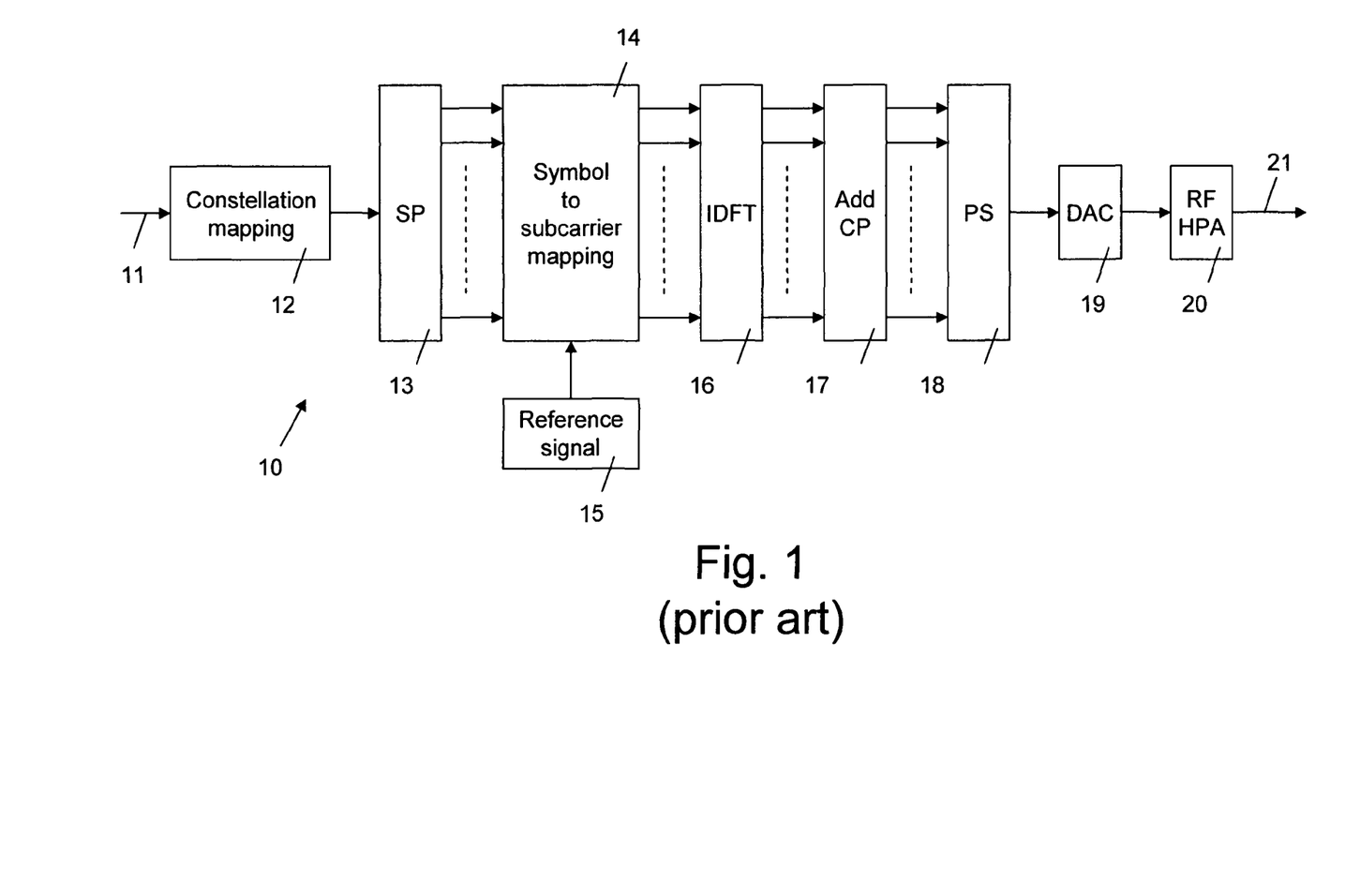
FIG. 1 shows a block diagram of a typical prior art transmitter equipment for wireless radio transmission in accordance with an Orthogonal Frequency Division Multiplexing (OFDM) scheme.

In FIG. 1 reference numeral 10 refers to a typical example of a prior art transmitter equipment for wireless radio transmission in accordance with an Orthogonal Frequency Division Multiplexing (OFDM) scheme. The transmitter device 1 is typically used in downlink transmission from a radio access unit or radio Base Station (BS) to User Equipment (UE) in a Long Term Evolution (LTE) cellular wireless radio transmission system.

An incoming serial digital data bit stream at an input 11 of the transmitter 10 is subjected to symbol constellation mapping, such as Binary Phase Shift keying (BPSK), Quadrature Phase Shift Keying (QPSK) or Quadrature Amplitude Modulation (QAM), for example 16QAM or 64QAM, in a symbol constellation mapping or symbol modulation module 12. The higher the QAM modulation index, the more bits are mapped onto a symbol. The serial stream of symbols thus produced is converted to a parallel symbol stream by a Serial-to-Parallel (SP) converter 13. The symbol rate of a parallel stream is a fraction of the symbol rate of the serial symbol stream. It is noted that the operations of the constellation mapping module 13 and the S/P-converter 13 can be swapped. That is S/P-conversion first, followed by the constellation mapping.

In accordance with an OFDM scheme, each parallel symbol stream of the S/P-converter 13 is mapped, in the frequency domain, onto a subcarrier of plurality of orthogonal subcarriers in a symbol-to-subcarrier mapping module 14. The subcarriers are each spaced over a fixed frequency interval $\Delta f$.

Among others for frequency error correction purposes, known reference signals are introduced. These reference signals may be introduced at the input 11 as a known digital bit stream, for example, but also directly as symbols to be mapped onto a respective subcarrier or subcarriers from a reference signal module 15.

The symbols mapped by the symbol-to-subcarrier mapping module 14 are subjected to an Inverse Discrete Fourier Transformation (IDFT) operation by IDFT module 16, by which the parallel symbol streams in the frequency domain are transformed into the time domain, generally by an Inverse Fast Fourier Transform (IFFT) computation. To reduce dispersion effects, in the time domain, the symbols are lengthened by a so-called Cyclic Prefix (CP) in an Add-CP module 17. The CP is a partial repetition of the symbol sequence from the end to the beginning. The duration is chosen larger than the channel delay spread, which will help in reducing Inter-Symbol Interference (ISI) at the receiver side.

For transmission of the data over a physical radio channel, the parallel symbol streams extended by the CP are converted into a serial symbol stream by a Parallel-to-Serial (PS) converter 18. In a Digital-to-Analog-Converter (DAC) 19 the digital symbol stream is converted into an analog symbol stream and by amplification and up-conversion in a Radio Frequency (RF) High Power Amplifier (HPA) 20, the thus formed information stream is provided at an output 21 of the transmitter 1 for transmission over a physical radio channel.

Although not explicitly shown in FIG. 1, the transmitter 10 may comprise rate matching, filtering, error correction such as Cyclic Redundancy Code (CRC) generator and spectrum shaping blocks, for example, and the thus generated signal may be fed from output 21 to a plurality of antennas of a Multiple-Input Multiple-Output (MIMO) transmission system, to increase the diversity gain and/or the system capacity by exploiting the spatial domain for transmission over the air interface to a receiver of UE.

Figure 2:
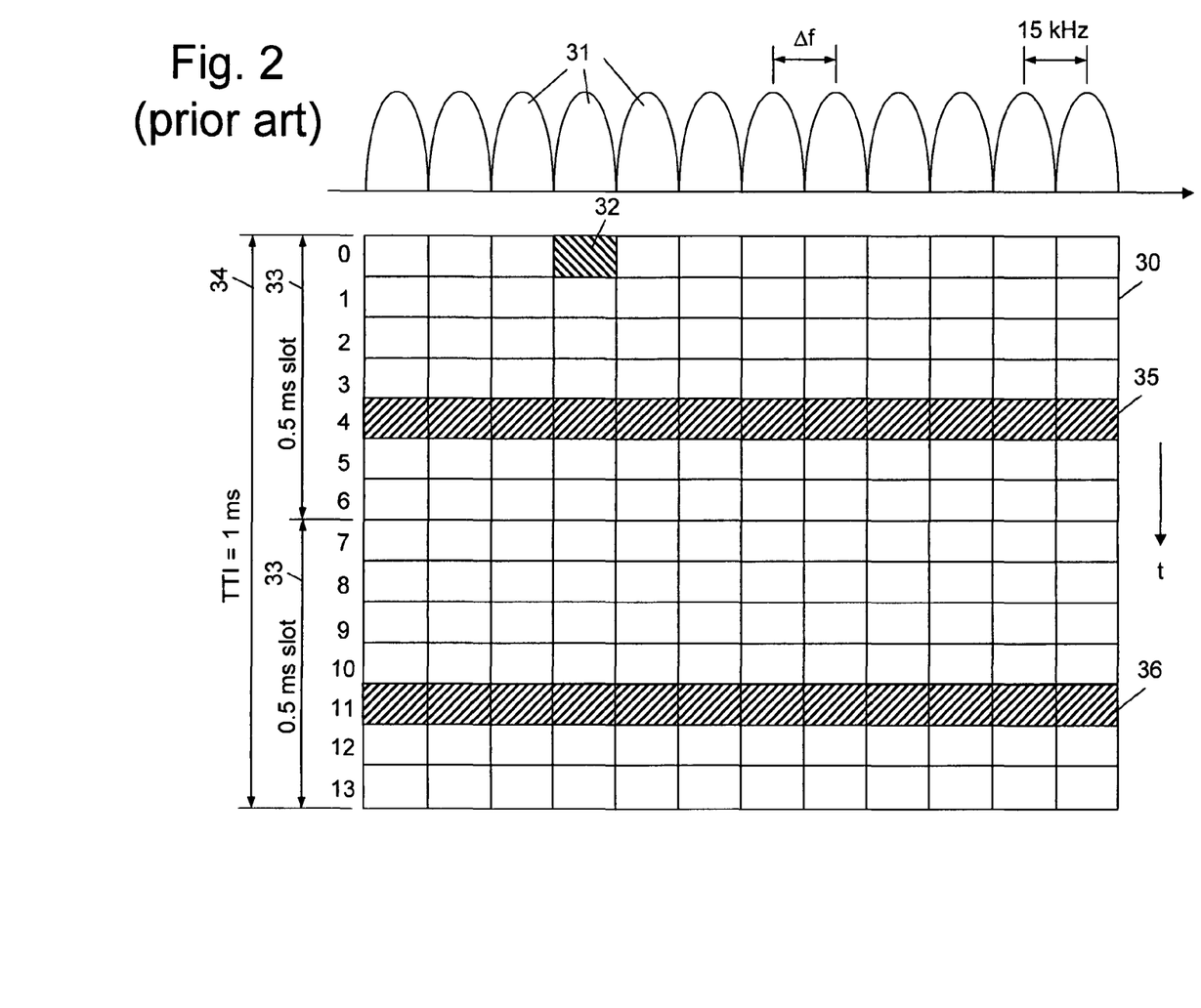
FIG. 2 shows, in a schematic and illustrative manner, a time-frequency grid of a symbol-to-carrier mapping at a downlink of a Long Term Evolution (LTE) cellular wireless radio transmission system.

FIG. 2 shows an example of a so-called time-frequency grid 30 of the symbol-to-carrier mapping in the LTE cellular wireless radio transmission system as developed by the 3$^{rd}$ Generation Partnership Project (3GPP) and disclosed in Technical Specification 3GPP TS 36.211 (Release 8). The orthogonal subcarriers 31 are spaced in the frequency dimension, f, at a mutually equal spacing Δf of 15 kHz. In the time dimension, t, a number of symbols 32, also called OFDM symbols, is grouped into time slots 33. The duration of a symbol 32 equals (1/Δf)+CP.

In LTE, the grid 30 consists of twelve orthogonal subcarriers 31, i.e. twelve OFDM symbols 32 along the frequency axis f, and fourteen OFDM symbols 32 along the time axis t. In time, seven OFDM symbols 32 form a time slot 33 having a duration of 0.5 ms. Two time slots 33 make up one Transmission Time Interval (TTI) 34 having a duration of 1 ms. The TTI 34 is a basic transmission unit of wireless cellular radio transmission protocols. In LTE terminology, the time-frequency grid 30 is also called a resource block, and an OFDM symbol 32 is also called a resource element.

In FIG. 2, the dashed lines 35 and 36 indicate known reference signals, such as pilot signals, introduced in the resource block 30, among others for identification and frequency correction purposes. This will be dealt with further on in this description.

In a practical embodiment of an LTE transmitter, more than twelve subcarriers 31 are used, providing a plurality of resource blocks 30. Which resource blocks and how many a user gets at a given point in time depends on advanced scheduling mechanisms in the frequency and time dimensions. The scheduling mechanisms enable optimal performance for different services in different radio environments.

In the uplink of LTE, radio transmission from UE is based on Single Carrier-Frequency Division Multiple Access (SC-FDMA), which is also referred to as pre-coded OFDM.

A transmitter for uplink operates generally as the OFDM transmitter 1 discussed above, however to construct SC-FDMA symbols, the modulated symbols of the constellation mapping or symbol modulation module are transformed to the frequency domain by a digital Discrete Fourier Transform (DFT) of the same size as the number of modulated symbols of each SC-FDMA symbol.

Figure 3:
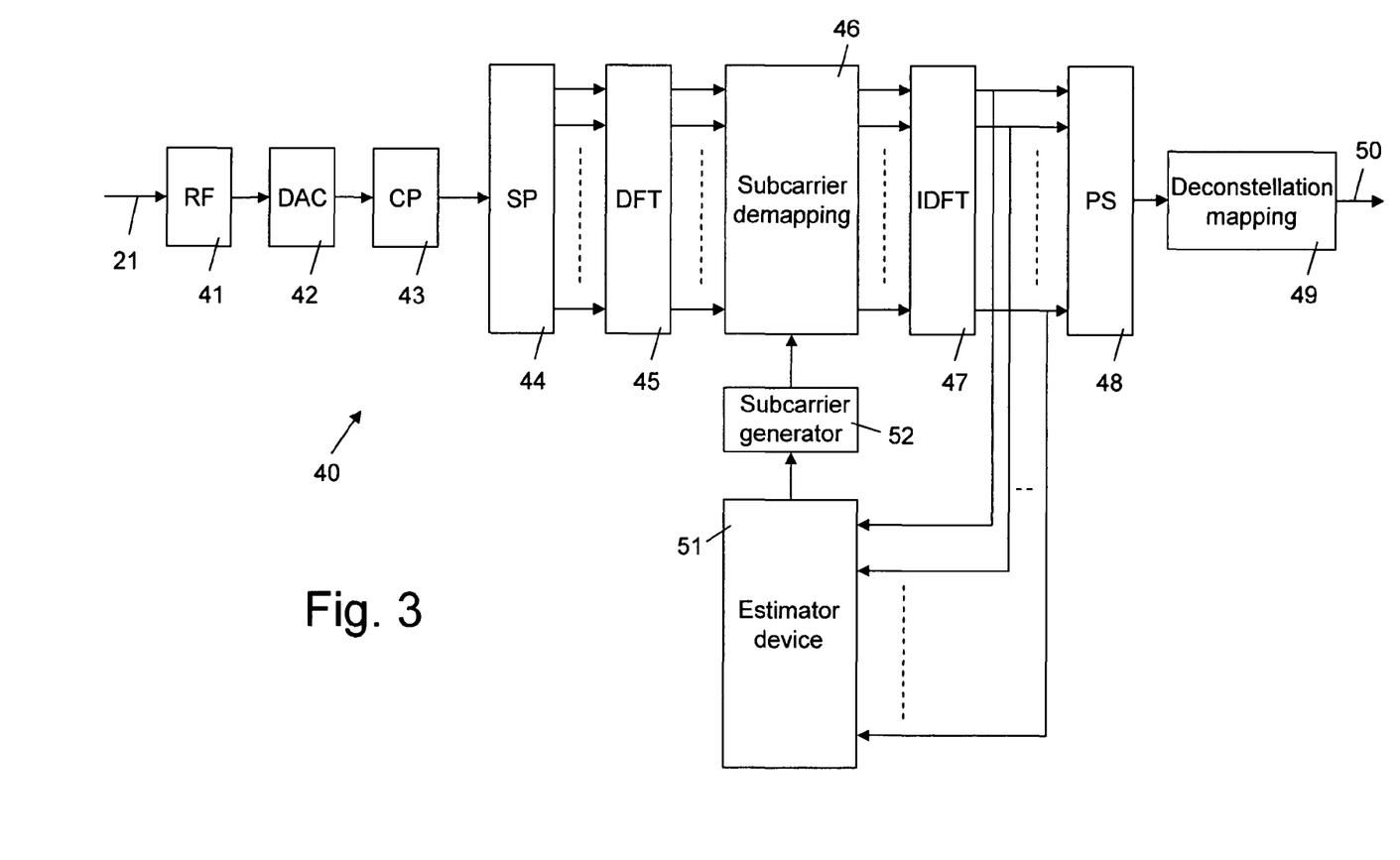
FIG. 3 shows a block diagram of OFDM receiver equipment in accordance with the invention.

FIG. 3 shows a receiver equipment 40 for the reception of OFDM wireless radio transmission for use in UE of an LTE cellular wireless radio transmission system in accordance with the invention.

An information stream transmitted over the physical radio channel 21 arrives at an antenna or antennas of a RF receiver module 41 and is down converted to baseband. Then, the signal is transformed into a digital sequence after it passes an Analog-to-Digital Converter (ADC) 42. If the receiver device 40 is synchronized, the CP from each OFDM symbol is removed in CP removal module 43. The remaining serial symbol stream is passed through a serial-to-parallel (SP) converter 44 and a Discrete Fourier Transform (DFT) is computed by a DFT module 45, generally by a Fast Fourier Transform (FFT) computation. The resulting complex points in the frequency domain are the complex baseband representation of the modulated subcarriers. Subcarrier demapping by a subcarrier demapping in module 46 provides the OFDM symbols as shown in the time-frequency grid of FIG. 2. In an OFDM receiver in a BS of a cellular wireless radio transmission the output of the subcarrier demapping module 46 is further processed in the frequency domain.

Typical for UE, after subcarrier demapping in module 46, the resulting OFDM symbols in the frequency domain are transformed by an IDFT module 47 into parallel streams of OFDM symbols in the time domain. By a parallel-to-serial (PS) converter 48 a serial OFDM symbol stream is formed. The original digital data bit stream is reconstructed from the serial OFDM symbol stream by de-constellation mapping or demodulation in a de-constellation mapping unit 49 and presented at the receiver output 50.

Although not explicitly shown, after the DFT module 45, in the frequency domain, Frequency Domain Equalizers (FEQ) may be arranged for compensating gain and phase distortion introduced by the channel at the subchannel's frequency. Further, the RF receiver module 41 may form part of a Multiple-Input Multiple-Output (MIMO) transmission system.

In accordance with the invention, from the OFDM symbols provided by the IDFT module 47, a carrier frequency offset estimate is calculated by an estimator device 51, an output of which controls a carrier frequency generator device 52. The carrier frequency generator device 52 operates on the subcarrier demapping module 46, as shown in FIG. 3. A carrier frequency generator device 52 for generating subcarriers is as such known to those skilled in the art and does not need further elaboration.

Figure 4:
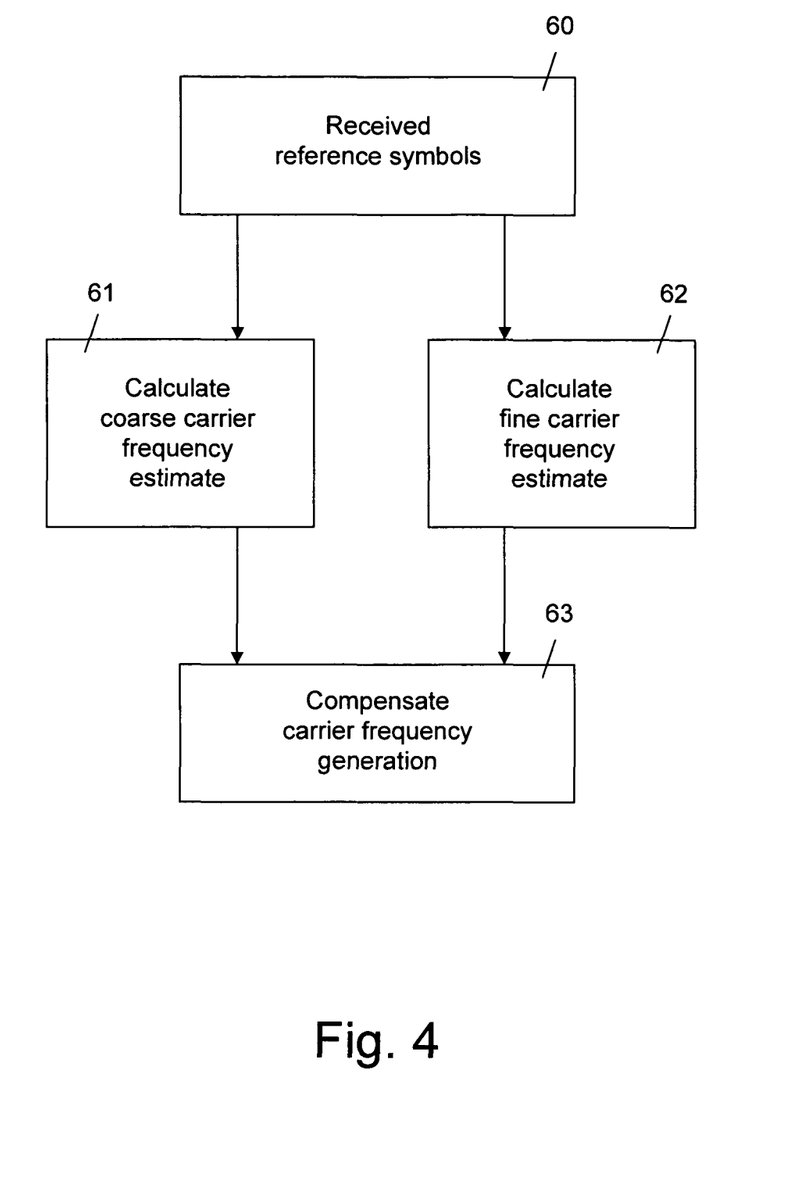
FIGS. 4 and 5 show flow charts of examples of the method of compensating carrier frequency generation in OFDM radio communication equipment in accordance with the invention.
Figure 5:
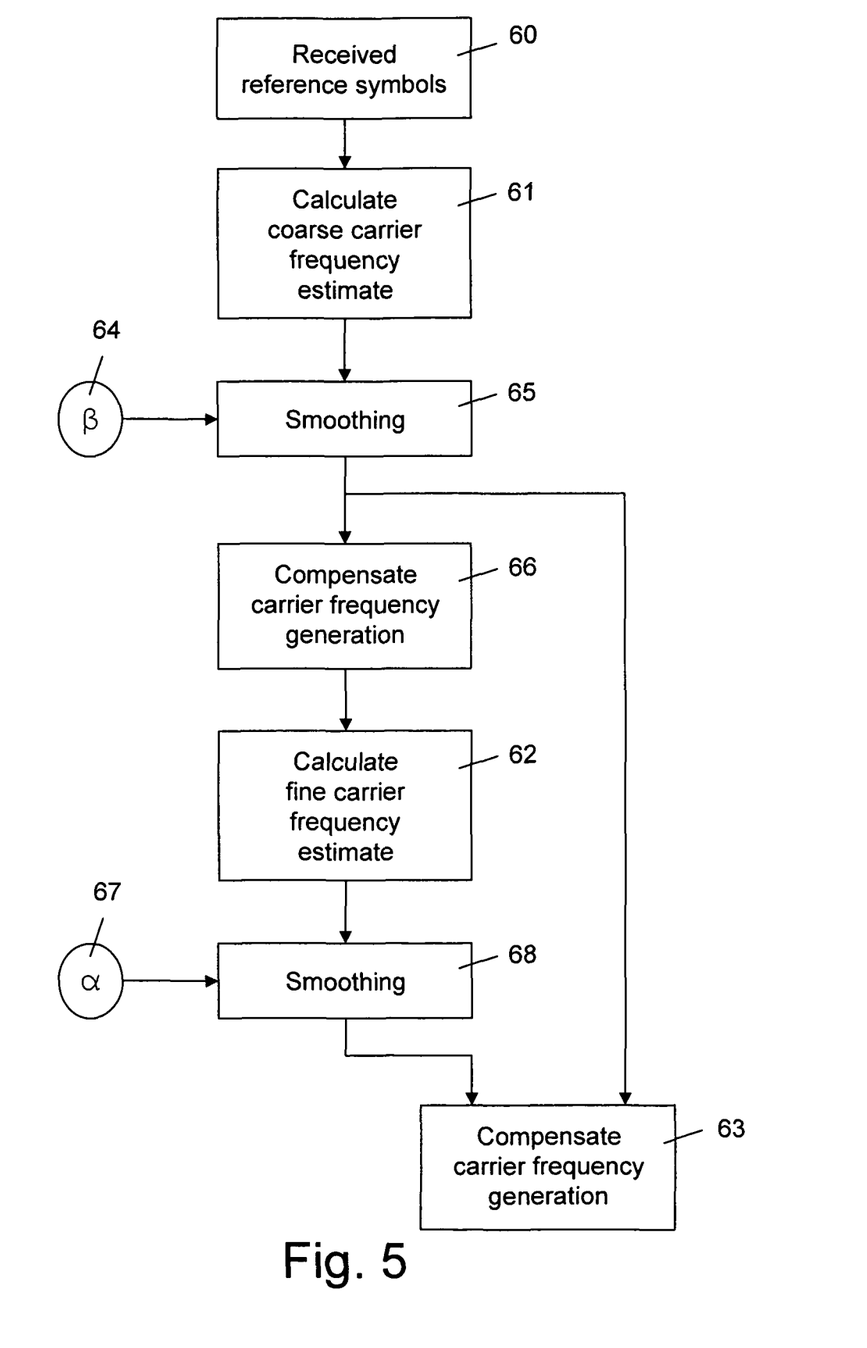

The operation of the estimator device 51 will now be further detailed with reference to the flow charts as shown in FIG. 4 and FIG. 5. It is noted that the transmitter equipment 10 shown in FIG. 1 and the receiver equipment 40 shown in FIG. 3 may be combined in a single transceiver equipment.

In FIG. 4, received reference symbols or also called pilot symbols are indicated by block 60. The reference symbols of block 60 may be retrieved at the output of the IDFT module 47 of the receiver device 40 as shown in FIG. 3.

According to the invention, as illustrated by block 61, from the received reference symbols of block 60 a coarse carrier frequency offset estimate is calculated. The coarse carrier frequency offset estimate is calculated from the reference symbols of a single reference signal, such as the reference signal 35 or 36 as shown in FIG. 2. In LTE, for example, wherein the reference symbols are mapped at subcarriers operating with a subcarrier spacing Δf of 15 kHz, frequency in the interval of [−7.5, 7.5] kHz can be estimated.

As illustrated by block 62, in addition to the coarse carrier frequency offset estimate, a fine carrier frequency offset estimate is calculated from reference symbols of block 60 corresponding to a same, in the time domain repetitively, received reference signal, such as the repetitively received reference signal 36, 37 shown in FIG. 2. In LTE, wherein reference signals are repetitively transmitted with an interval of 0.5 ms, frequency errors in the interval of [−1000, 1000] Hz can be estimated.

In accordance with the invention, by jointly using the calculated coarse and fine carrier frequency estimates 61, 62 for compensating carrier frequency generation, i.e. as shown by block 63 in FIG. 4, the variance of the joint carrier frequency offset estimate is lowered, such that carrier frequency generation in communication equipment can be compensated for carrier frequency offset errors over a wider frequency interval than is possible with a fine carrier frequency offset estimate. In LTE, for example, it can be shown that with the invention, an accurate joint carrier frequency offset estimate in at least the interval [−2000, 2000] Hz can be provided, which is sufficient to cover the desired frequency range of [−1800, 1800] for LTE, as outlined above and disclosed in LTE 3GPP Technical Specifications.

Although not explicitly shown in FIG. 4, the calculation of each the coarse and the fine carrier frequency offset estimate may involve smoothing, for example by integrating a calculated carrier frequency offset estimate over a time period.

This smoothing is used to further reduce the variance of the estimate, however to the expense of slower tracking.

The flow chart of FIG. 5 illustrates another example of the method according to the invention, wherein also the above-mentioned smoothing has been introduced.

Different from the example shown in FIG. 4, the fine carrier frequency offset estimate is calculated 62 from reference symbols of reference signals repetitively received after the carrier frequency generation in the receiver equipment is compensated 65 by the calculated coarse carrier frequency offset estimate 61.

The calculated coarse carrier frequency offset estimate 61 is used to compensate the carrier frequency generation 66 such that the remaining offset frequency is already lowered and can be reliably estimated by the calculation of a fine carrier frequency offset estimate 62.

The calculated coarse carrier frequency offset estimate 61 and the calculated fine carrier frequency offset estimate 62 are jointly used to compensate a frequency offset in the carrier frequency generation at the communication equipment, as indicated by block 63.

Before applying the calculated coarse frequency offset estimate 61, a smoothing operation is carried out, block 65. In this example, the calculated coarse frequency error offset estimate 61 is integrated over a period of time controlled by a parameter β, 64. Before applying the calculated fine frequency offset estimate 62, a smoothing operation is carried out, block 68. In this example, the calculated fine frequency error offset estimate 62 is integrated over a period of time controlled by a parameter α, 67. The parameters α, β are independent, such that different integration time periods can be set.

Instead of an integration operation, smoothing of the calculated carrier frequency offset estimates, such as shown in blocks 65, 68 may comprise calculation of a time running average of a calculated carrier frequency offset estimate 61, 62, for example.

Figure 6:
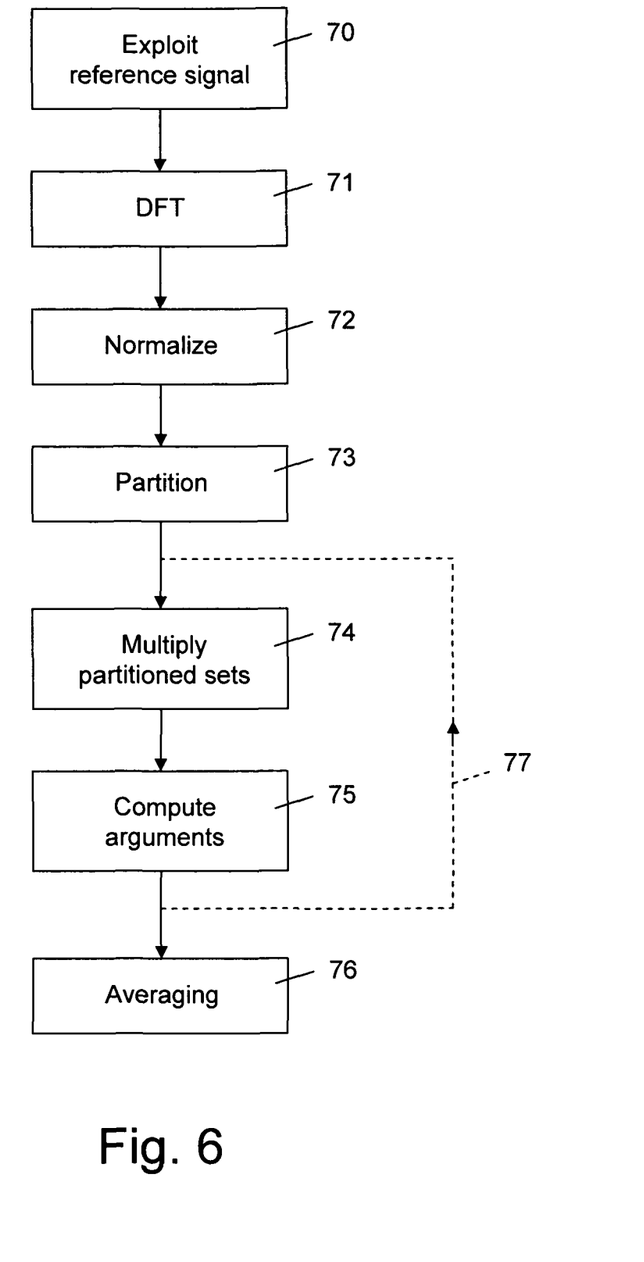
FIG. 6 shows a flow chart of the calculation of a carrier frequency offset estimate from a reference signal received at OFDM radio communication equipment in accordance with the invention.

FIG. 6 shows a flow chart of the calculation of a coarse carrier frequency offset estimate from a reference signal received at OFDM radio communication equipment in accordance with the invention.

In a first step, block 70 "Exploit reference signal", a reference signal received at the receiver is exploited in a sequence of reference symbols, wherein each reference symbol is modulated on a different subcarrier k. Mathematically a reference symbol of the exploited reference signal can be generally expressed as:

$$p_k = e^{-j\frac{\pi u k(k+r)}{N}} \quad (1)$$

wherein:
k=$k^{th}$ subcarrier
u=variable
r=variable
N=total number of subcarriers The Fourier transform of a reference symbol of Eq. (1) is:

$$P_f = \frac{e^{j\frac{\pi(-2f+ru)^2}{4Nu}}}{\sqrt{2\pi\frac{ju}{N}}} \quad (2)$$

wherein: f=frequency

Here, the Fourier transform has been sampled to yield the time discrete Fourier transform a of each reference symbol, block 71 "DFT".

Since the received reference signal is subject to carrier frequency offset errors, the received reference symbols become translated in the frequency. Assuming that the given channel is constant over the used subcarriers and that the carrier frequency offset error is equal for all subcarriers, i.e. ε, and noting that the reference signal is known to the receiver, the time discrete frequency domain representation of each frequency translated, i.e. f-ε, received reference symbol can be normalized with respect to a time discrete frequency domain representation of the corresponding reference symbol of the reference signal known to the receiver equipment, block 72 "Normalize".

Form Eq. (2) the normalized frequency translated reference symbols become:

$$P_{0,f} = h_f \frac{e^{j\frac{\pi(-2f+2\varepsilon+ru)^2}{4Nu}}}{e^{j\frac{\pi(-2f+ru)^2}{4Nu}}} = h_f e^{j\frac{\pi\varepsilon(2f-\varepsilon-ru)}{Nu}} \quad (3)$$

wherein:
$h_f$=normalization constant
$P_{0,f}$=normalized reference symbol
ε=offset error In Eq. (3) it can be noted that the normalized reference symbol becomes linear in frequency but non-linear in the carrier frequency error. Assuming that the carrier frequency offset error ε is relatively small, Eq. (3) may be linearized as:

$$P_{0,f} \approx h_f e^{j2\pi f \frac{\varepsilon}{Nu}} \quad (4)$$

Assume that $h_f \approx 1$ and that the normalization produces identical reference symbols over the frequency spectrum.

Next, the normalized reference symbols over the frequency spectrum for a user are partitioned in at least a first and a second set of consecutive normalized time discrete frequency domain transformed reference symbols, block 73 "Partition". By multiplying each normalized time discrete frequency domain transformed reference symbol of a first set, $P_{o,f}$ by a correspondingly located conjugate normalized time discrete frequency domain transformed reference symbol $\bar{P}_{0,q}$ of a second set, $P_{o,q}$, the following relation holds:

$$P_{0,f}\bar{P}_{0,q} = h_f \bar{h}_q e^{j\frac{2\pi M\varepsilon}{Nu}} \approx e^{j\frac{2\pi M\varepsilon}{Nu}} \quad (5)$$

wherein M=f−q, the distance between the first and the second set. This distance depends on the number of sets into which the normalized reference symbols have been partitioned. However, because the subcarrier spacing of the symbols is known, for example 15 kHz in LTE, the parameter M is known. Basically, each subcarrier is multiplied by a conjugated subcarrier M positions ahead, block 74 "Multiply partitioned sets".

From the argument of Eq. (5), for each multiplication of reference symbols, the carrier frequency error ε can be computed, block 75 "Compute arguments". Averaging the computed arguments, block 76 "Averaging", provides the coarse frequency offset estimate.

Figure 7:
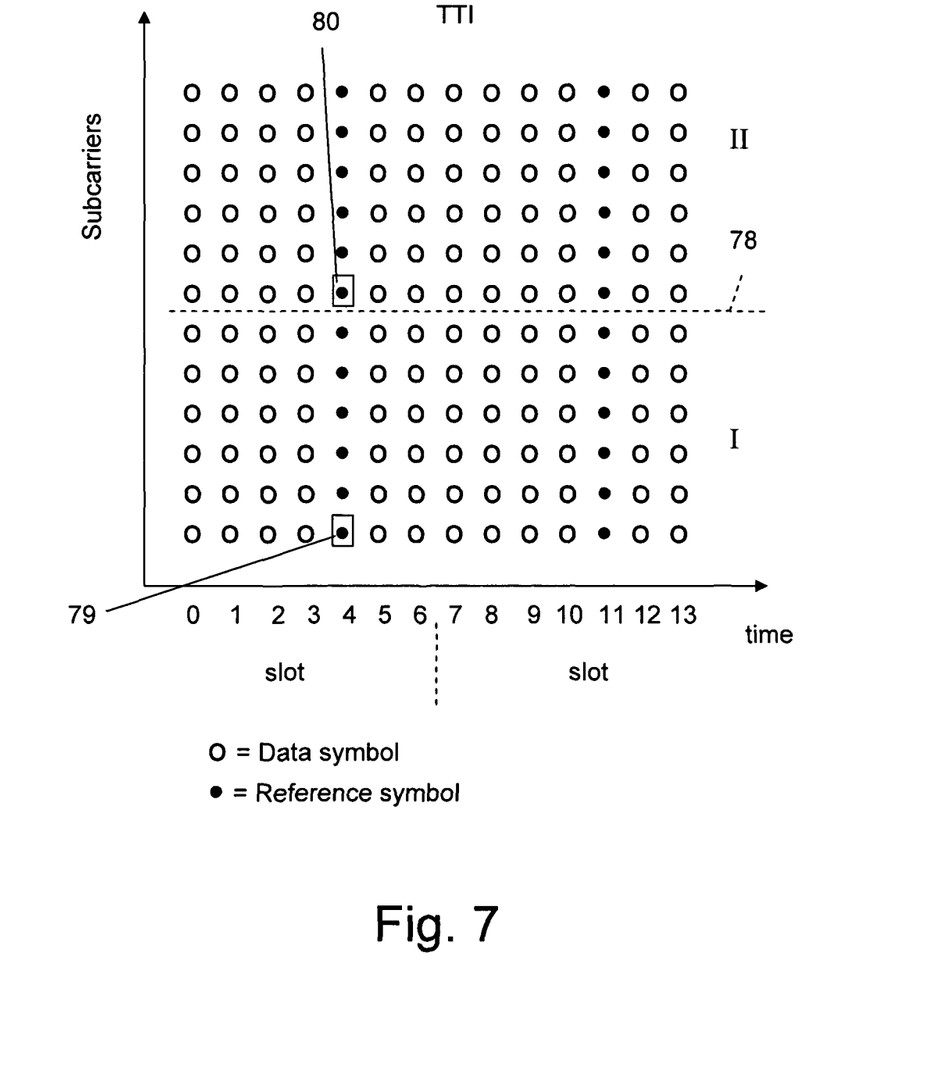
FIG. 7 illustrates, in a schematic and illustrative manner, a processing step of the calculation of a carrier frequency offset estimate from a reference signal received at OFDM communication equipment, in accordance with the invention.

In FIG. 7 an example of the partitioning is schematically illustrated for a TTI as used in LTE, see also FIG. 2. The resource elements are depicted as bullets. A bold bullet refers to a reference symbol. An open bullet refers to a data symbol. In this example, the reference symbols are divided in two halves or two sets, as indicated by the dashed line 78. That is a first halve indicated by roman I, and a second set halve indicated by roman II.

For a particular reference signal, a normalized reference symbol of the first set I, for example the reference symbol indicated by reference numeral 79, is multiplied by the complex conjugate of the correspondingly located normalized reference symbol of the second set II, indicated by reference numeral 80, in accordance with Eq. 5. The multiplication is repeated for all reference symbols of a received reference signal.

The partitioning may comprise more than two sets. In such a case, the steps of blocks 74 and 75 in FIG. 6 are repeated for all reference symbols of the sets, as schematically indicated by reference numeral 77. In practice, for LTE for example, a partitioning in two sets of equal size, as indicated in FIG. 7, may be sufficient to provide an accurate joint carrier frequency offset estimate in accordance with the invention in the interval [−2000, 2000] Hz.

Figure 8:
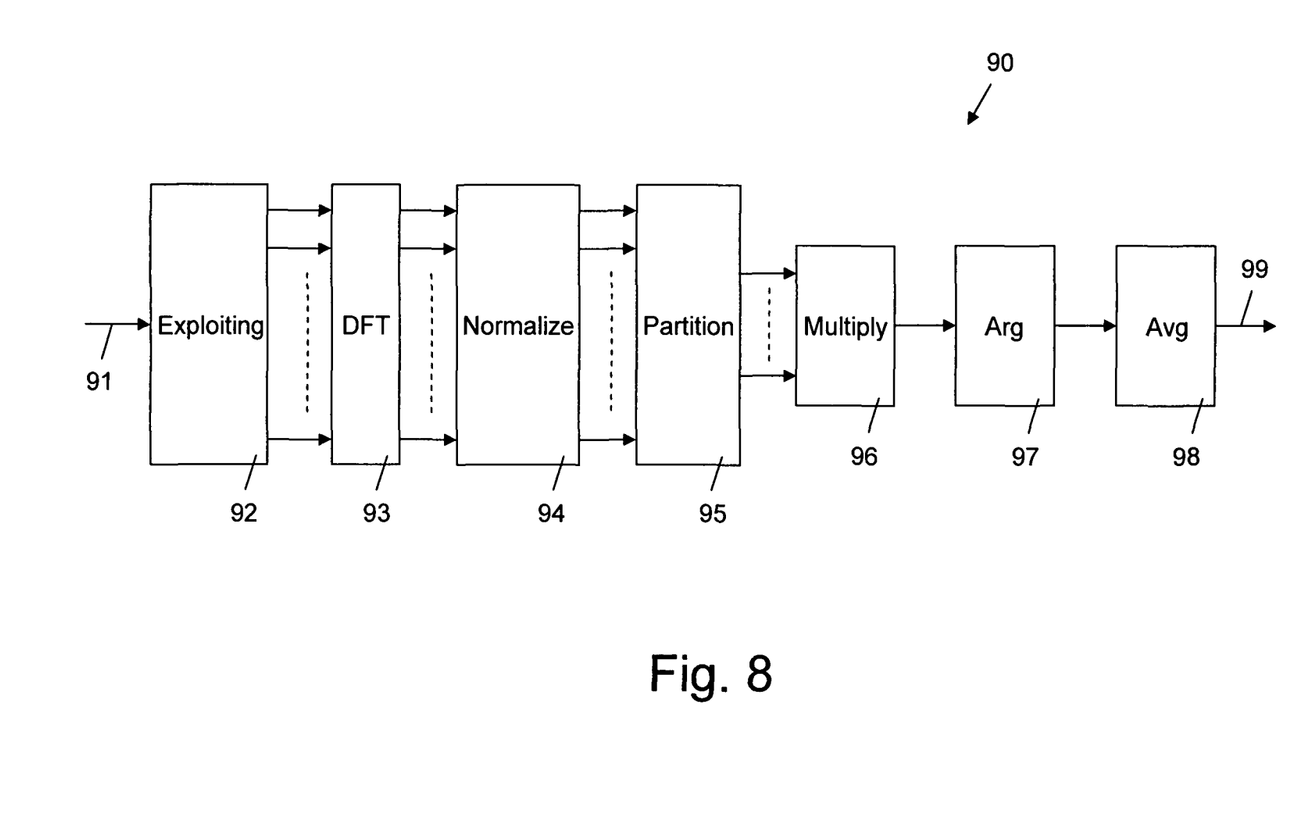
FIG. 8 shows a block diagram of an estimator module for calculating a carrier frequency offset estimate from a reference signal in accordance with an example of the method of the invention.

In accordance with the invention, FIG. 8 shows a block diagram of an example of an estimator module 90 for calculating a coarse carrier frequency offset estimate from a reference signal transmitted in accordance with the method disclosed above and illustrated in FIG. 6.

A reference signal received by receiver equipment 40 according to an Orthogonal Frequency Division Multiplex, OFDM, based wireless radio transmission scheme, is provided at an input 91 of the estimator module 90. In an exploiting module 92 the received reference signal is exploited in a sequence of reference symbols, in accordance with Eq. (1). A Fourier transform module 93 is arranged for computing a time discrete frequency domain transformation of each reference symbol of the sequence of reference symbols, in accordance with Eq. (2). In a normalizing module 94 the normalized time discrete frequency domain transformation of each reference symbol is normalized with respect to a time discrete frequency domain representation of a corresponding reference symbol of the reference signal known to the receiver equipment, in accordance with Eqs. (3) and (4). The normalizing module 94 provides a sequence of normalized time discrete frequency domain transformed reference symbols which are partitioned by partitioning module 95, in at least a first and a second set of consecutive normalized time discrete frequency domain transformed reference symbols. Multiplication module 96 multiplies, of each set, each normalized time discrete frequency domain transformed reference symbol of a first set by a correspondingly located conjugate normalized time discrete frequency domain transformed reference symbol of a second set. In calculating module 97 of each said multiplication its argument is calculated and the thus computed arguments are averaged by averaging module 98, provide the frequency offset estimate at output 99 of the estimator module 90.

The compensation of the carrier frequency offset error can be made in the frequency domain by recognizing that the frequency error shifts the frequency content. This implies that the frequency grid is offset to some extent and the objective is to compute the frequency content at the correct frequency grid. Basically, one can use the sampling theorem and more precise the reconstruction formula. This formula states that any point on a band limited signal can be computed given a sampled representation of the signal in question. That is, the sampled signal is used and points between are interpolated using the impulse response of an ideal low-pass filter. The interpolation, is of course equivalent to a filtering operation.

Figure 9A:
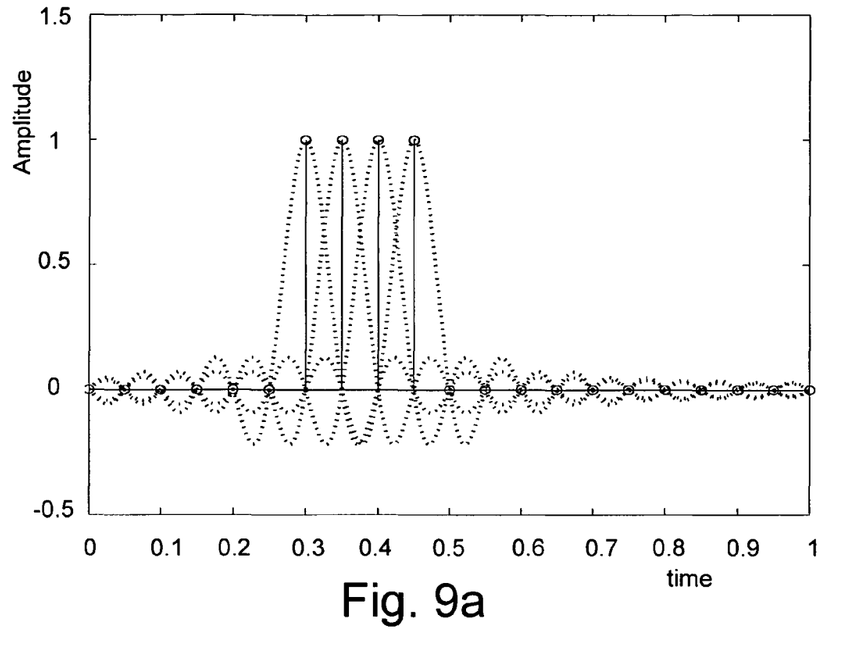
FIG. 9a shows, in an amplitude vs. time graph, a perfect spectral match of a sampled signal.
Figure 9B:
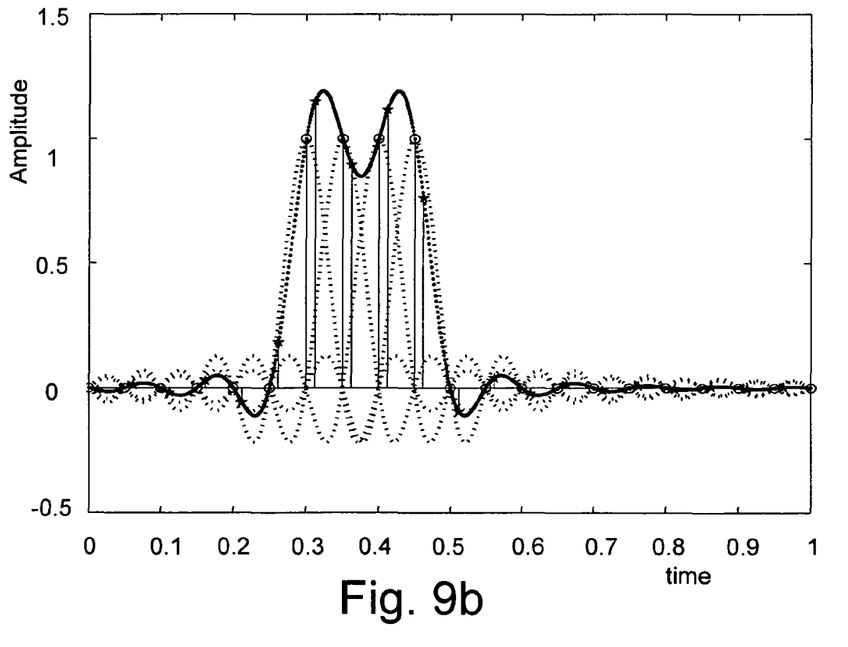
FIG. 9b shows, in an amplitude vs. time graph, the signal of FIG. 9b shifted by a frequency offset error.

In FIGS. 9a, 9b this is illustrated. FIG. 9a shows, in an amplitude vs. time graph, a perfect spectral match of a sampled signal. FIG. 9b shows the signal of FIG. 9a shifted by a frequency offset error. However, the sampled signal can be reconstructed at any point on the continuous function also shown. Evidently, interpolation is used via a Finite Impulse Response (FIR) filter using as coefficients a shifted ideal lowpass filter, that is to say one phase function of a polyphase filter. In FIGS. 9a, 9b the amplitude and time values indicated are for illustration purposes only.

Those skilled in the art will appreciate that, although the present invention has been particularly elucidated with respect to the Long Term Evolution (LTE) based radio transmission scheme, this must not be construed as limiting upon the invention the scope of protection of which is defined by the appended claims.

The invention claimed is:

1. A method of compensating carrier frequency generation in communication equipment for radio transmission in an Orthogonal Frequency Division Multiplex (OFDM) based wireless radio communication system in which reference signals known to the communication equipment are transmitted in a regular time repetitive manner, wherein a coarse carrier frequency offset estimate and a fine carrier frequency offset estimate are calculated from said reference signals received at said communication equipment, wherein said coarse carrier frequency offset estimate is calculated from reference symbols of one of said reference signals received at said communication equipment, and wherein said carrier frequency generation is compensated by said calculated coarse and fine carrier frequency offset estimates, and said fine carrier frequency offset estimate is calculated from: i) reference symbols of a first of one of said reference signals received at said communication equipment at a first point in time (t1) and ii) reference symbols of a second of one of said reference signals received at said communication equipment at a second point in time (t2) that is different than said first point in time, wherein said reference symbols used to calculate the coarse frequency offset estimate comprise at least a first reference symbol and a second reference symbol, said first reference symbol is modulated on a first carrier, and said second reference symbol is modulated on a second carrier that is different than said first carrier.

2. The method according to claim 1, wherein said fine carrier frequency offset estimate is calculated after said carrier frequency generation in said communication equipment is compensated by said calculated coarse carrier frequency offset estimate.

3. The method according to claim 1, further comprising the step of smoothing at least one of said calculated coarse and fine carrier frequency offset estimate, and compensating said carrier frequency generation in said communication equipment by said at least one smoothened carrier frequency offset estimate.

4. The method according to claim 3, wherein said step of smoothing comprises integration of a calculated carrier frequency offset estimate over a time period, which time period is set differently for each of said calculated coarse and fine frequency carrier offset estimate.

5. The method according to claim 3, wherein said step of smoothing comprises calculation of a time running average of a calculated carrier frequency offset estimate.

6. The method according to claim 1, wherein said step of calculating said coarse frequency offset estimate includes the steps of:
- exploit a reference signal received at said communication equipment in a sequence of reference symbols, each reference symbol modulated on each subcarrier,
- perform a time discrete frequency domain transformation of each reference symbol of said sequence of reference symbols,
- normalize said time discrete frequency domain transformation of each reference symbol with respect to a time discrete frequency domain representation of a corresponding reference symbol of said reference signal known to the receiver equipment, providing a sequence of normalized time discrete frequency domain transformed reference symbols,
- partition said sequence of normalized time discrete frequency domain transformed reference symbols in at least a first (I) and a second equally sized set (II) of consecutive normalized time discrete frequency domain transformed reference symbols,
- multiply each normalized time discrete frequency domain transformed reference symbol of a first set (I) by a correspondingly located conjugate normalized time discrete frequency domain transformed reference symbol of a second set (II),
- compute of each said multiplication its argument, and
- average said computed arguments to provide said coarse frequency offset estimate.

7. The method according to claim 6, wherein said multiplication and computation is repeated for all sets (I, II) of normalized time discrete frequency domain transformed reference symbols.

8. The method according to claim 6, wherein said sequence of normalized time discrete frequency domain transformed reference symbols is partitioned in two sets (I, II).

9. The method according to claim 1, wherein said carrier frequency generation is compensated in the frequency domain by computing a compensated carrier frequency grid from a sampled representation of a carrier frequency grid received at said communication equipment shifted by said calculated coarse and fine carrier frequency offset estimates in the frequency domain.

10. The method according to claim 1, wherein said communication equipment is any of radio access equipment and user equipment arranged for operation in a Long Term Evolution, LTE, cellular wireless radio transmission system.

11. A hardware estimator module, for calculating a coarse carrier frequency offset estimate from a reference signal transmitted in accordance with an Orthogonal Frequency Division Multiplex, OFDM, based wireless radio transmission scheme, said estimator module comprising a memory and further comprising:
- a hardware exploiting module, arranged for exploiting a reference signal in a sequence of reference symbols, each reference symbol being modulated on each subcarrier,
- a Fourier transform module, arranged for performing a time discrete frequency domain transformation of each reference symbol of said sequence of reference symbols,
- a normalizing module, arranged for normalizing said time discrete frequency domain transformation of each reference symbol with respect to a time discrete frequency domain representation of a corresponding reference symbol of said reference signal known to the receiver equipment, providing a sequence of normalized time discrete frequency domain transformed reference symbols,
- a partitioning module, arranged for partitioning said sequence of normalized time discrete frequency domain transformed reference symbols in at least a first and a second equally sized set of consecutive normalized time discrete frequency domain transformed reference symbols,
- a multiplication module, arranged for multiplying each normalized time discrete frequency domain transformed reference symbol of a first set by a correspondingly located conjugate normalized time discrete frequency domain transformed reference symbol of a second set,
- a calculating module, arranged for calculating of each said multiplication its argument, and
- an averaging module, arranged for averaging said computed arguments to provide said frequency offset estimate.

12. The method of claim 1, wherein
said reference symbols used to calculate the fine frequency offset estimate comprise at least a first reference symbol, a second reference symbol, a third reference symbol, and a fourth reference symbol,
said first and third reference symbols are modulated on a first carrier,
said second and fourth reference symbols are modulated on a second carrier that is different than said first carrier,
said first and second reference symbols are transmitted at time t1, and
said third and fourth reference symbols are transmitted at time t2.

* * * * *

UNITED STATES PATENT AND TRADEMARK OFFICE
CERTIFICATE OF CORRECTION

Page 1 of 1

PATENT NO.       : 8,660,197 B2
APPLICATION NO.  : 13/254075
DATED            : February 25, 2014
INVENTOR(S)      : Lindgren et al.

It is certified that error appears in the above-identified patent and that said Letters Patent is hereby corrected as shown below:

On the Title Page, item (57), under "ABSTRACT", in Column 2, Line 4, delete "known" and insert -- known to the --, therefor.

In the Specification

In Column 8, Lines 23-24, delete "constellation mapping module 13" and insert -- constellation mapping module 12 --, therefor.

Signed and Sealed this
Eighth Day of July, 2014

Michelle K. Lee
*Deputy Director of the United States Patent and Trademark Office*